United States Patent [19]

Tanaka

[11] Patent Number: 4,702,360
[45] Date of Patent: Oct. 27, 1987

[54] VISCOUS FLUID COUPLING

[75] Inventor: Seiya Tanaka, Bisai, Japan

[73] Assignee: Aisin Seiki Kabushiki Kaisha, Kariya, Japan

[21] Appl. No.: 810,258

[22] Filed: Dec. 18, 1985

[30] Foreign Application Priority Data

Dec. 20, 1984 [JP] Japan .......................... 59-192287[U]

[51] Int. Cl.$^4$ ....................... F16D 35/00; F16D 43/25
[52] U.S. Cl. ................................. 192/58 B; 192/82 T
[58] Field of Search ......................... 60/347, 352, 357;
192/82 T, 58 B, 58 A, 58 R

[56]  References Cited

U.S. PATENT DOCUMENTS

| | | | |
|---|---|---|---|
| 4,036,339 | 7/1977 | Kikuchi | 192/82 T |
| 4,051,936 | 10/1977 | Crisenbery et al. | 192/82 T |
| 4,313,531 | 2/1982 | Hori et al. | 192/82 T |
| 4,502,580 | 3/1985 | Clancey | 192/82 T |
| 4,574,929 | 3/1986 | Hayashi et al. | 192/82 T |

*Primary Examiner*—Allen M. Ostrager
*Attorney, Agent, or Firm*—Oblon, Fisher, Spivak, McClelland & Maier

[57]  ABSTRACT

A viscous fluid coupling especially used for driving the cooling fan of engines, changing the rotation speed of the fan smoothly according to the temperature. The smooth change of the rotation speed, that is, the smooth change of torque transmission by the coupling is performed by employing a valve device which has a slot for passing fluid and a specially shaped valve member movable to control the opening and closing of the slot so that the rate of increase of the opening area of the slot is smaller in a low temperature region than in a high temperature region.

1 Claim, 6 Drawing Figures

VISCOUS FLUID COUPLING

BACKGROUND OF THE INVENTION

1. Field of the Invention

The present invention relates to a viscous fluid coupling which transmits the torque to a driven member, depending on the temperature conditions, more particularly, to a viscous fluid coupling suited to driving the cooling fan of an engine with appropriate torque by sensing the temperature in the engine room.

2. Description of the Prior Art

The structure of conventional viscous fluid couplings of the above type is such that is has an input member equipped with a rotor and an output member equipped with an internal chamber which houses a rotor and viscous fluid, said internal chamber being divided into a working chamber which accommodates a rotor and a reservoir chamber which stores fluid with a partition and the circulating passageway between the working chamber and the reservoir chamber being equipped with a valve device and a pumping mechanism. The valve device comprises a slot formed in the partition and a valve member which opens and closes said slot and which is driven by a temperature sensitive member. The temperature sensitive member senses the ambient temperature so as to increase the opening of the slot with an increase in the temperature by rotating the valve member.

Ordinarily, the shape of the slot is, as mentioned in the Japanese Patent Publication No. 27089 of 1965 (No. 40-27089), L-shaped or linear-shaped with a fixed width, and a plate member formed into a rectangular shape is used for the valve member. The relation between the slot and the valve member is such that the valve member rotates on the slot, so that the opening of the slot increases at a certain rate.

One may be apt to think that if the opening of the slot increases at a certain rate in proportion to the increase in the ambient temperature, the amount of the viscous fluid in the working chamber which contributes to torque transmission increases and the rotational speed of the output member also increases proportionally. As shown in FIG. 3, however, the rotational speed of the output member is not proportional to the amount of the viscous fluid in the working chamber, and a slight additional amount sharply increases the rotational speed of the output member and a saturated condition is reached immediately by a subsequent increase in the amount of the viscous liquid, so that the rate of speed increase shows a tendency to decline. Therefore, the increasing of the opening of the slot at a certain rate does not increase the rotational speed of the output member in proportion, as in the Japanese Patent Publication No. 27089 of 1965, and the rotational speed has two steps in a certain temperature region. Even when the shape of the slot is changed to a L-shaped one so that the opening becomes extremely large in the high temperature region, the rotational speed still has two steps and the curve is sharply raised in a temperature region as shown by broken lines in FIG. 4. When this conventional device is used to drive the cooling fan of the engine cooling system, the temperature region in which the rotation is changed over from low to high speed is normally set at a low level to protect the engine. That is to say, when the cooling capacity is not sufficient in low speed rotation, it is abruptly changed over to high speed rotation. This type of cooling causes overcooling of the engine for a while after rotation is changed over to high speed rotation, resulting in loss of the driving power, increased noise, and other disadvantages. It is also likely that the rotational speed of the fan changes periodically or so-called hunting takes place, depending on the relation.

SUMMARY OF THE INVENTION

The object of the present invention is to provide an improved viscous liquid coupling which can increase the rotational speed of the output member in proportion to the ambient temperature and prevent the occurrence of hunting and noise when it is used for driving the cooling fan of the engine cooling system.

In accordance with the present invention, the shape of the slot and the valve member is selected and determined so that the rate of increase of the opening area becomes smaller at a lower temperature than at a high temperature. That is, the rotational speed of the output member is proportional to the ambient temperature by restraining the rate of increase of the opening area at a low temperature by selecting the shape of the slot and the valve member.

The viscous fluid coupling according to the present invention works as follows:

At a low temperature, the area of the opening which is determined by the slot and valve member is small and the large volume of the viscous fluid in the working chamber is pumped into the reservoir chamber by a pumping mechanism provided in the circulating passageway. The viscous fluid in the reservoir chamber enters the working chamber through the opening and contributes to torque transmission of the rotor. Since the rate of increase of the area of the opening with increase of temperature is low in the low temperature region, the amount of the viscous fluid circulated into the working chamber is limited and the rotational speed of the output member increases slowly with no steep rise. The rate of increase of the area of the opening increases with an increase in temperature, but the rate of contribution of the amount of the viscous fluid in the working chamber to torque transmission decreases as shown in FIG. 3, so that the rotational speed of the output member increases gradually and linearly in proportion to the increase in temperature.

The present invention, considering the relation between the amount of the viscous fluid in the working chamber and transmission torque, relates to the valve construction so as to increase the rotational speed of the output member in relation to the increase in the ambient temperature, thereby permitting smooth control of speed and provides the effects of preventing hunting and noise when used as a device for driving the cooling fan of the engine cooling system.

As in the following embodiment, the contact area between the valve member and partition plate can be reduced by forming a valve structure in which a through hole is formed in a valve member, thereby the sliding resistance being reduced and the rotational response of the output member against the temperature variation being improved.

Other and further objects, features and advantages of the present invention will be understood more clearly and fully from the following detailed description of preferred embodiments with reference to the attached drawings.

DESCRIPTION OF THE PREFERRED EMBODIMENTS

Figure 2:
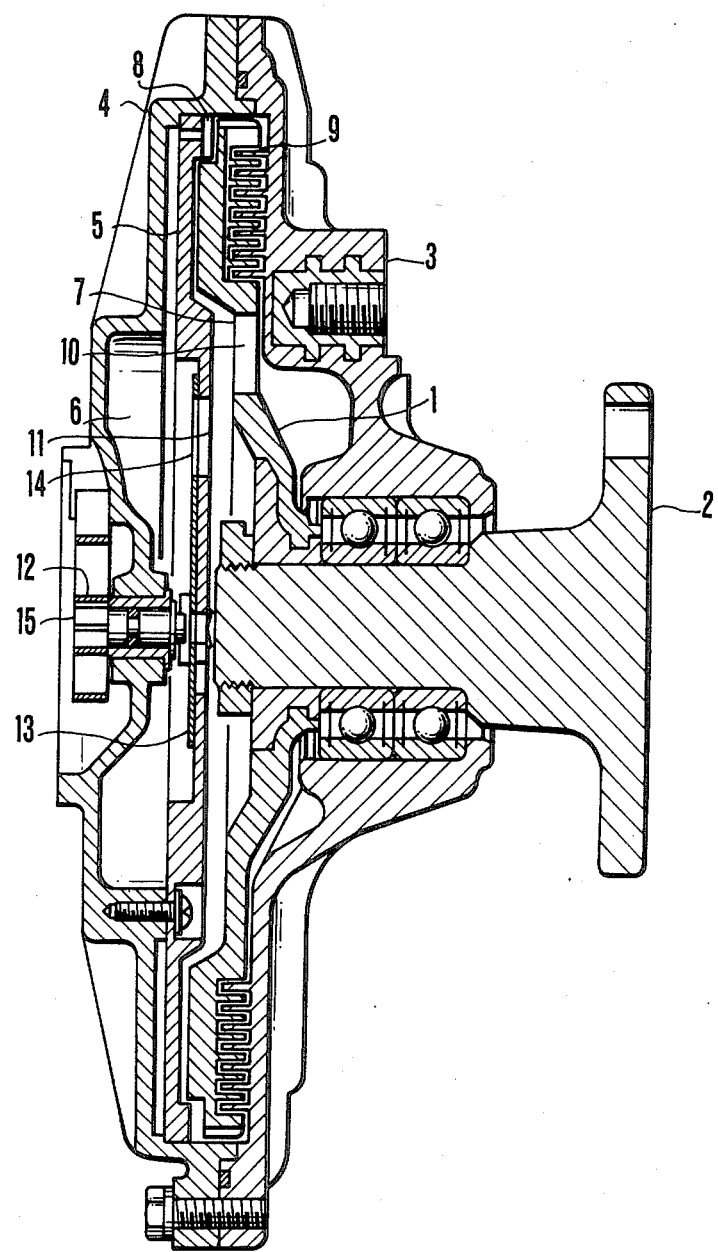
FIG. 2 shows the sectional view of a viscous fluid coupling which uses the valve construction of the present invention.
Figure 3:
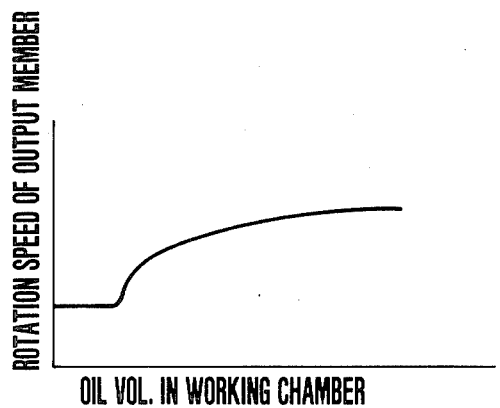
FIG. 3 is the relational diagram in which the horizontal axis shows the amount of the viscous fluid in the working chamber and the vertical axis shows the rotational speed of the output member.

Referring to FIG. 2 which shows the overall structure of one embodiment of the viscous fluid coupling of the present invention, rotor 1 is integral with input member 2 and is rotatably supported in an internal chamber constructed of output members 3 and 4. The internal chamber is divided into the reservoir chamber 6 that stores viscous fluid and working chamber 7 that houses rotor 1, by means of partition 5. In reservoir chamber 6 and working chamber 7, a viscous fluid circulation passageway 8 is formed. In the circulating passageway, there are arranged a pumping mechanism which feeds the viscous fluid from working chamber 7 to reservoir chamber 6 with pressure, labyrinth-like torque transmitting surface 9 between rotor 1 and output member 3, passageway 10 that leads to torque transmitting surface 9, slot 11 formed on partition 5 to circulate the viscous fluid from reservoir chamber 6 to working chamber 7, and a valve member which controls the opening and closing of slot 11 and is rotated on partition 5 by temperature sensitive member 12. Slot 11 and valve member 13 cooperate to form opening 14 when they are in a certain relation. When a spiral bimetal is used as temperature sensitive member 12, one end is fixed at output member 4 and the other end to freely rotatable rod 15 to rotate valve member 13.

Figure 1:
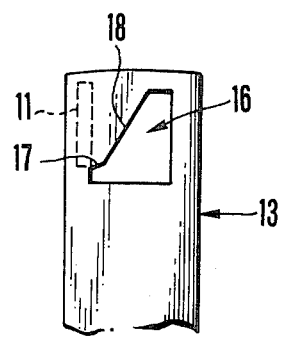
FIGS. 1(a), 1(b), and 1(c) show the plan view of the key portion of a viscous fluid coupling embodying the present invention in three different operating positions.
Figure 1:
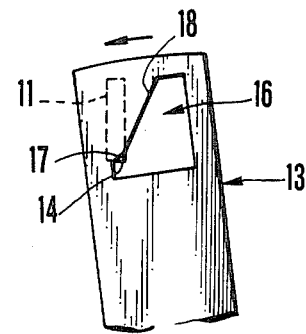
Figure 1:
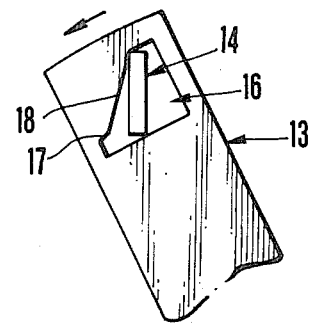

In this embodiment, slot 11 formed on partition plate 5 is a long and narrow rectangular hole which extends in the radial direction, as shown in FIG. 1 (a), and a trapezoidal through hole 16 of which one side is inclined is formed in valve member 13, correspondingly to the position and shape of slot 11, and the through hole has a two-step slope on the slant side. The first-step slope 17 located inside the radial direction has a gentle inclination with respect to the radial direction and is formed short, while the second-step slope 18 outside the radial direction has a steeper inclination than that of the first-step slope 17 and is formed so as to be dimensionally longer.

When the ambient temperature is low, that is, when the valve member is in the position shown in FIG. 1 (a), the through hole 16 has no portion which overlaps slot 11, and valve member 13 blocks slot 11. When temperature sensitive member 12 senses the temperature rise at a low temperature and rotates valve member 13 to the position shown in FIG. 1 (b), first-step slope 17 intersects the outer edge of slot 11 and forms opening 14 at the portion where through hole 16 overlaps slot 11. Since the inclination of first-step slope 17 is gentle, the rate of area increase with respect to the rotational angle of valve member 13 of opening 14 at a low temperature, that is with respect to temperature rise becomes lower. When the ambient temperature rises and reaches the high temperature region, second-step slope 18 intersects the outer edge of slot 11 and the rate of area increase of opening 14 becomes higher. FIG. 1 (c) shows the state in which entire slot 11 is visible in through hole 16 at a high temperature.

Figure 4:
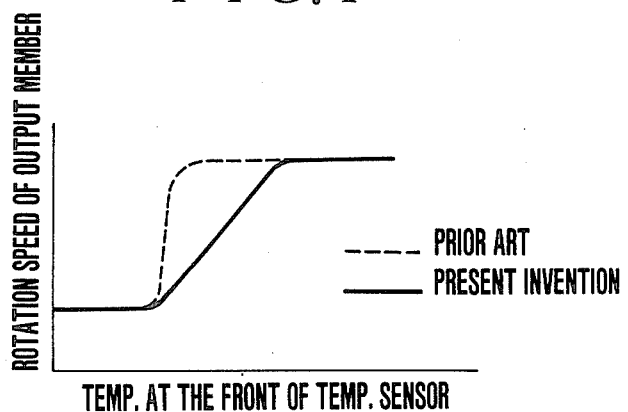
FIG. 4 is a characteristic curve showing the relation between the rotational speed and temperature when the viscous fluid coupling of the present invention is used to drive the cooling fan, in which the horizontal axis shows the air temperature at the front of the temperature sensing member and the vertical scale shows the rotational speed of the output member.

When a viscous fluid coupling having the above-mentioned valve structure is used as a device to drive the cooling fan of the engine cooling system, a rotational speed of the cooling fan proportional to the increase in the ambient temperature can be obtained as shown by the solid line in FIG. 4. This embodiment is just one example and it is possible to properly select the shape of the slot and valve member within the range of technological concept of this invention. For example, by making the shape of the slot equivalent to that of the through hole in the valve member in the aforementioned embodiment and making the shape of the valve member rectangular to rotate the valve member on the slot, the same effect can be attained.

It should be understood that, although the preferred embodiment of the present invention has been described herein in considerable detail, certain modifications, changes, and adaptations may be made by those skilled in the art and that it is hereby intended to cover all modifications, changes and adaptations thereof falling within the scope of the appended claims.

What is claimed is:

1. A viscous fluid coupling, comprising:
   an input member equipped with a rotor,
   an output member equipped with an internal chamber for housing viscous fluid and said rotor,
   a partition dividing said internal chamber into a working chamber of said rotor and a reservoir chamber for viscous fluid, said partition having a rectangular-shaped slot forming a passageway for circulating viscous fluid,
   a pump mechanism for communicating viscous fluid with pressure from said working chamber to said reservoir chamber,
   a valve member for controlling the opening and closing of said slot,
   a temperature sensor for sensing ambient temperature and moving said valve member rotatively so that the opening area of said slot becomes large according to increase of temperature, and
   said valve member having a through hole for opening and closing said slot according to the rotative movement of the valve member, said through hole having a trapezoidal shape of which one side edge is formed with a two-stepped slope, the first step slope being shorter and gentler as compared to the second step slope, so that the increase rate of said opening area of the slot is smaller in a low temperature region than in a high temperature region.

* * * * *